United States Patent [19]

Yamashita

[11] Patent Number: 5,121,259
[45] Date of Patent: Jun. 9, 1992

[54] VIDEO TAPE RECORDER WITH AFTER-RECORDING CAPABILITY

[75] Inventor: Keitaro Yamashita, Tokyo, Japan
[73] Assignee: Sony Corporation, Tokyo, Japan
[21] Appl. No.: 434,431
[22] Filed: Nov. 13, 1989

[30] Foreign Application Priority Data

Nov. 22, 1988 [JP] Japan .................. 63-295270

[51] Int. Cl.$^5$ .............................................. G11B 5/02
[52] U.S. Cl. ................................... 360/19.1; 358/343
[58] Field of Search ................. 360/19.1, 13, 35.1, 360/5; 358/341, 343

[56] References Cited

U.S. PATENT DOCUMENTS 4,303,950 12/1981 Taniguchi et al. .................. 360/19.1
4,353,098 10/1982 Heinz et al. ..................... 360/19.1 X
4,477,844 10/1984 Nakano et al. .................. 360/19.1 X

FOREIGN PATENT DOCUMENTS 2118802 11/1983 United Kingdom ............. 360/19.1

Primary Examiner—Andrew L. Sniezek
Attorney, Agent, or Firm—Lewis H. Eslinger; Jay H. Maioli

[57] ABSTRACT

A video tape recording apparatus having a tape guide drum with a cylindrical outer surface for guiding a magnetic tape in a helical fashion on the outer surface, and a pair of rotary magnetic heads rotating at a predetermined speed and provided in association with the tape guide drum for scanning skewed parallel tracks on the magnetic tape is specially adapted to perform after recording or dubbing. Each of the tracks is formed having a length to accommodate a pair of audio portions and a center video portion provided between the pair of audio portions. Rotational angles of the rotary magnetic heads corresponding to the length of the audio portions and the center video portion are expressed as follows, $$\Theta a + \Theta v = \Theta b + \Theta v = 180°$$

where $\Theta a$ and $\Theta b$ correspond to the audio portions and $\Theta v$ corresponds to the center video portion, respectively. In the case of audio after recording, selected audio portions are left blank during the initial recording operation and the after recording audio signal is recorded therein at a later time.

6 Claims, 3 Drawing Sheets

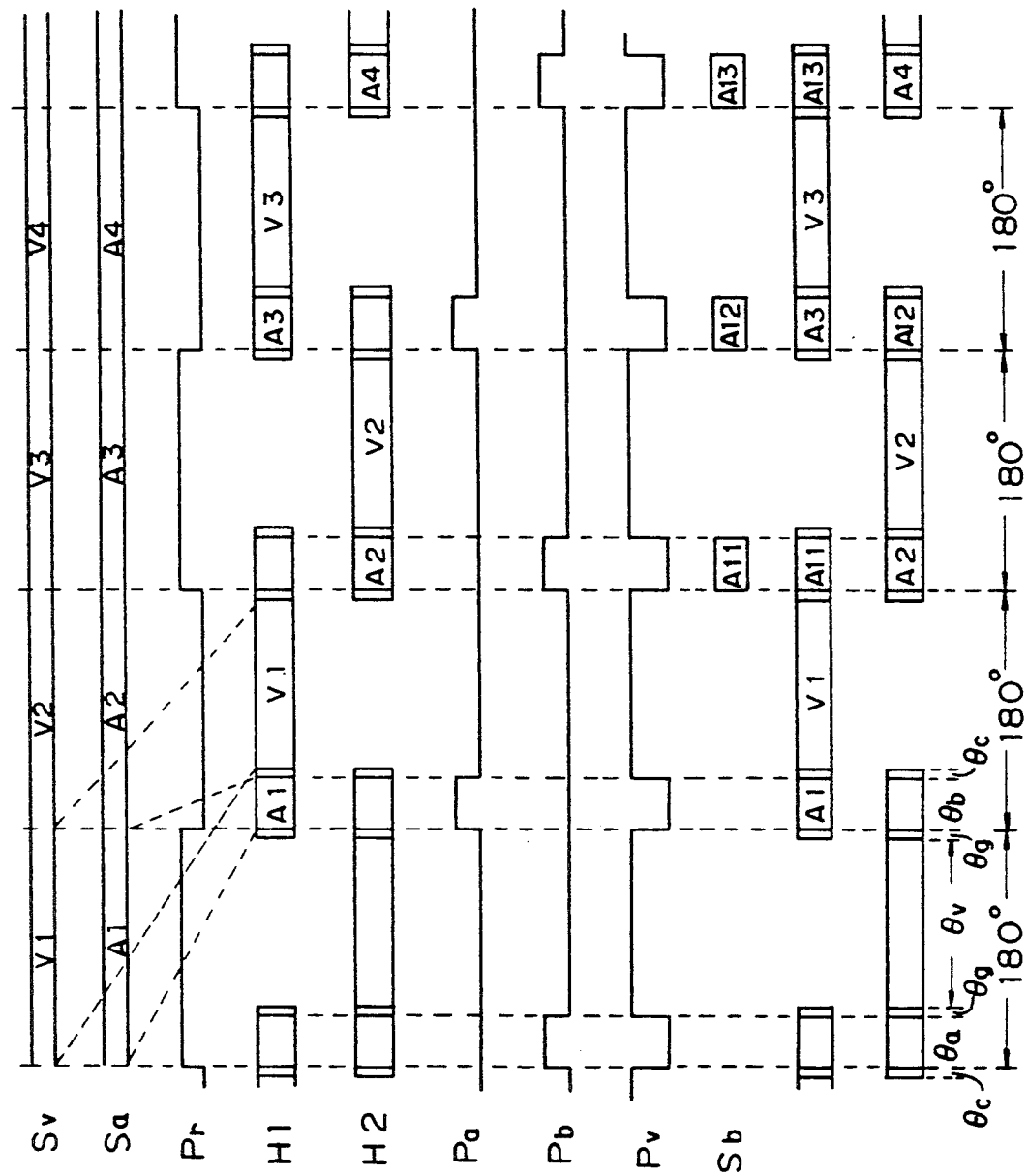

VIDEO TAPE RECORDER WITH AFTER-RECORDING CAPABILITY

BACKGROUND OF THE INVENTION

1. Field of the Invention

This invention relates generally to a rotary-head, helical-scan video tape recorder that records a video signal and an audio signal in the same slant track and, more particularly, to a video tape recorder for editing the video and audio signals separately to perform after recording.

2. Description of the Background

A video tape recorder (VTR) is known in which an audio signal is recorded in the same slant tracks as the corresponding video signal. In such VTR a pair of heads are oppositely arranged at 180°, and the tape is wrapped at a wrap angle greater than 180° for instance, about 210°. The angle range of 180° is used as the recording area for the video signal, and the overlap angle range of about 30° is used as the recording area for a time-base compressed digital audio signal. This kind of VTR is also used to perform the so-called after recording, in which either the audio or video signal that has been recorded is changed or edited. Such after recording involves playing back the video portion, for example, while recording a new audio signal in place of the audio signal that was originally associated with that video signal.

In such case, when after recording a video signal or an audio signal, a recording voltage is ordinarily present at the recording head of around 0.5 to 2 $V_{p-p}$. On the other hand, upon playback, a reproducing voltage of only 0.1 mV to a few mV is generated at the head. It is then seen that the recording voltage is much, much larger than the reproducing voltage at the head. Thus, because in after recording the recording signal is intermixed with the reproduction signal, the reproduced image or reproduced audio signal is deteriorated to the point that it is lost. Therefore, it is very difficult to after record a video image while listening to the reproduced sound. On the other hand, in the case of after recording an audio signal while observing the reproduced image, the reproduced image is also disturbed during the audio recording time by this disparity in signal voltage levels.

Accordingly, a process to replace the reproduced video signal by another video signal in this period is needed. One method that has been proposed to cope with such a problem involves providing a reproducing amplifier in the head drum, so that the reproduced output is amplified to the same level as the recording voltage at a point very near the head. In another proposed solution a separate head is provided that is used only for after recording and any possible recording and reproduction time overlap is prevented by using a memory.

Both of these proposed solutions suffer drawbacks. For example, in the construction in which the reproducing amplifier is provided in the drum, it is necessary to supply power to the amplifier, so that a slip ring or a rotary transformer must be used. Slip rings, however, have a problem in terms of reliability. In the case of the rotary transformer, such transformers are generally expensive and, also, to prevent the mixing of the signals in the transformer, the frequency range of the signal is necessarily limited. On the other hand, practicing the latter method also has disadvantages, because a special head for after recording must be provided.

OBJECTS AND SUMMARY OF THE INVENTION

Accordingly, it is an object of the present invention to provide a helical-scan video tape recorder for performing after recording that can eliminate the above-noted defects inherent in the previously proposed recorders.

It is another object of the present invention to provide a rotary head video tape recorder in which an audio signal can be after recorded while observing a reproduced image, or an image can be after recorded while listening to reproduced audio material without using an amplifier assembly in a drum or without using a special, separate head.

In accordance with an aspect of the present invention, a video tape recorder comprises a tape guide drum having a cylindrical outer surface for guiding a magnetic tape in a helical fashion over the outer surface for an extent in excess of 180°. A pair of rotary magnetic heads rotating at a predetermined speed are provided in association with the tape guide drum for scanning skewed parallel tracks on the magnetic tape. Each of the tracks has a length that can accommodate a pair of audio portions and a center video portion provided between the pair of audio portions, wherein the relationship between rotational angles of the rotary magnetic head corresponding to the lengths of the audio portions and the center video portion is expressed as:

$$\Theta a + \Theta v = \Theta b + \Theta v = 180° \tag{1}$$

where $\Theta a$ and $\Theta b$ correspond to the pair of audio portions and $\Theta v$ corresponds to the center video portion. Thus, the total wrap angle is determined by $\Theta a + \Theta v + \Theta b$ and can be, for example, 210°.

The pair of rotary magnetic heads are arranged on the tape guide drum so as to be opposite each other and separated by 180°. The angle range $\Theta a$ and the angle range $\Theta b$ are respectively located before and after the angle range $\Theta v$ when viewed with the tape wrapped around the drum. The magnetic tape is wrapped around the peripheral surface of the tape guide drum in the angle range which is set such that ($\Theta a + \Theta v = \Theta b + \Theta v = 180°$.) The time-base compressed video signal is recorded in the angle range $\Theta v$, which is less than 180°. The time-base compressed audio signal that is originally supplied is recorded in one of the angle ranges $\Theta a$ and $\Theta b$. Thus, the time when the magnetic tape is respectively scanned by the pair of rotary magnetic heads in the angle range $\Theta v$ does not overlap the time when the magnetic tape is respectively scanned over the angle range $\Theta a$ or $\Theta b$. In the case of the previously proposed system using a track length corresponding to 210°, when one of the heads is supplied with a recording current for after recording, the other head is scanning the video track, so that the reproduced image will be deteriorated by the leakage from the former head to the latter head. On the other hand, according to the present invention, when the audio signal is recorded in the angle range $\Theta a$ or $\Theta b$ while reproducing the video signal in the angle range $\Theta v$ and the above angular relationships are followed, the reproduced video signal is not lost or overpowered by the recording signal. Similarly, when the video signal is recorded in the angle range $\Theta v$ while reproducing the audio signal in the range $\Theta a$ or $\Theta b$, the reproduced audio signal is not lost or overpowered by the recording signal. In other words, in the case of the present invention when one of the heads is supplied with a recording current for after recording the other head is scanning the old audio track portion, so that the reproduced image will not be deteriorated. In the case of after recording audio signals, the old audio track portions are not used.

Thus, after recording can be executed without providing a reproducing amplifier in the tape guide drum or providing a special magnetic head used only for after recording.

The above and other, objects, features, and advantages of the present invention will become readily apparent from the following detailed description thereof, which is to be read in connection with the accompanying drawings.

BRIEF DESCRIPTION OF THE DRAWINGS

FIGS. 3A–3K represent a timing chart useful in explaining the operation of the embodiment of the present invention shown in FIG. 1.

DETAILED DESCRIPTION OF PREFERRED EMBODIMENTS

Figure 1:
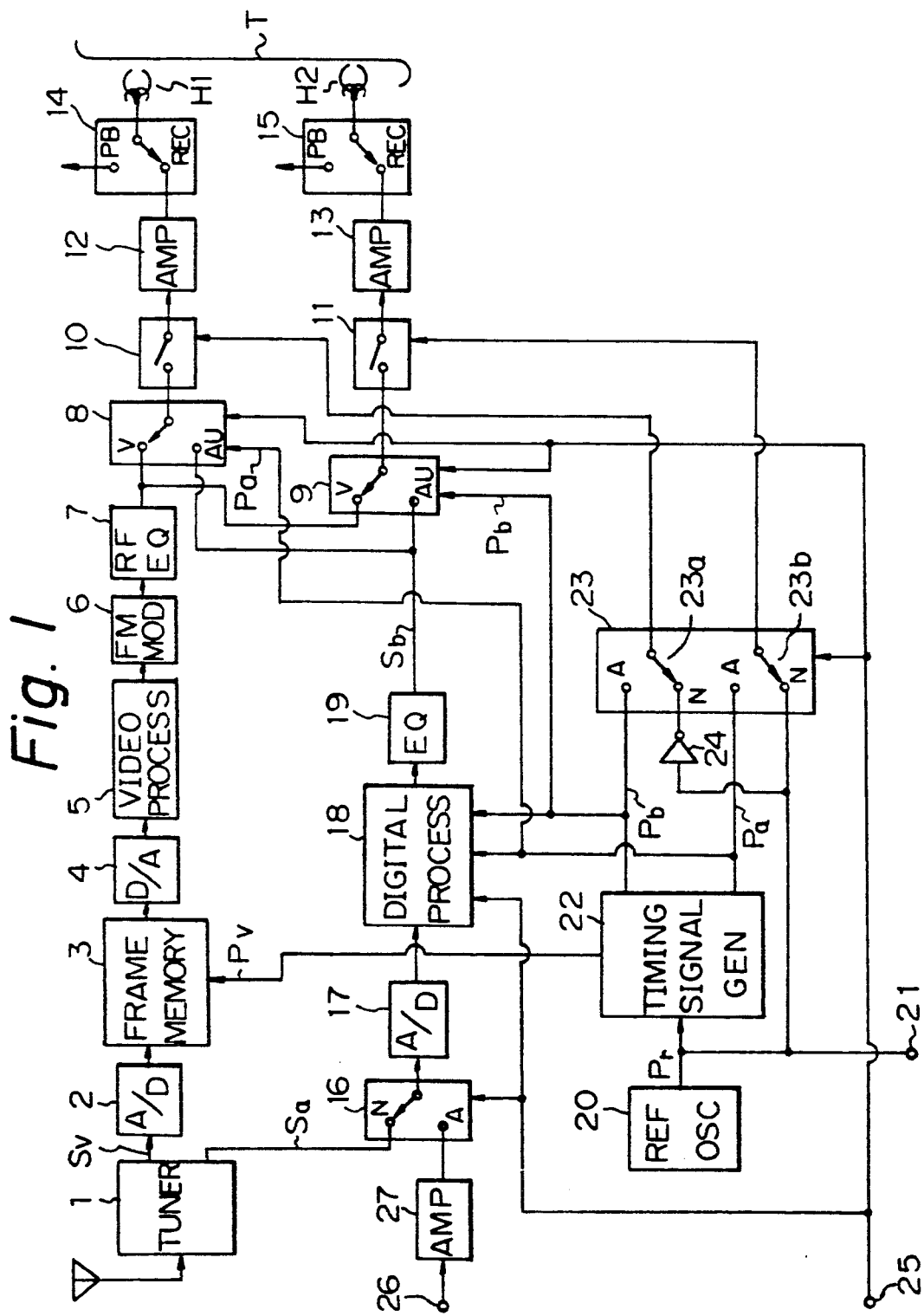
FIG. 1 is a schematic in block diagram form of a portion of a video tape recorder according to an embodiment of the present invention.
Figure 2:
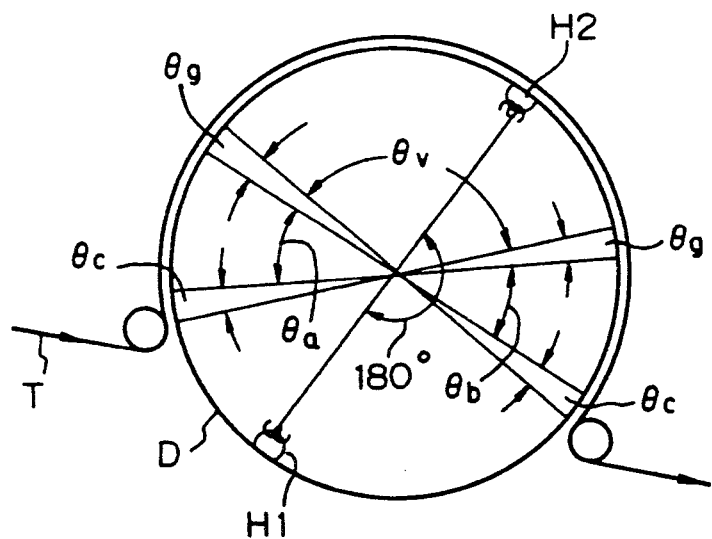
FIG. 2 is a diagrammatic representation of a tape guide drum and rotary heads useful in explaining the operation of the present invention.

In FIGS. 1 and 2, H1 and H2 indicate a pair of magnetic playback and recording heads arranged on a rotary drum D. The heads H1 and H2 are arranged on the drum D so as to be opposite each other and separated by an interval of 180°. Heads H1 and H2 can be of the kind having a single gap or a pair of gaps that are extremely close. On the other hand, there is a predetermined angle between the inclination of the gap of head H1 and the inclination of the gap of head H2, so that oblique azimuth recording can be performed in the well-known manner. In this embodiment in order to simplify the explanation, heads H1 and H2 are assumed to have a single gap. Heads H1 and H2 contact the magnetic tape T that runs at a constant velocity and that is obliquely wrapped around the peripheral surface of the drum D in the so-called helical manner. As shown in FIG. 2, the magnetic tape T is wrapped around the peripheral surface of the drum D for a predetermined extent.

In FIG. 2, $\Theta v$ denotes a wrap angle of tape T about drum D corresponding to an area of a slant track in which a video signal is recorded; $\Theta a$ and $\Theta b$ indicate wrap angles corresponding to areas of a slant track where an audio signal might be recorded; $\Theta g$ indicates a wrap angle corresponding to a guard area located between the recording area of the video signal and the recording area of the audio signal in a slant track; and $\Theta c$ indicates a wrap angle corresponding to an area of overlap between adjacent signal areas. The area denoted as $\Theta c$ represents a kind of safety margin area. Namely, even a 180° wrap VTR requires 180° plus a small additional angle to obtain an effective recording angle of 180°.

These wrap angles satisfy the relations of the following equations.

$$\Theta a = \Theta b \quad (2)$$

$$\Theta v + \Theta a \text{ (or } \Theta b) + 2\Theta g = 180° \quad (3)$$

When magnetic tape T is wrapped about drum D as mentioned above, heads H1 and H2 come into contact with magnetic tape T having phase relationships as shown in FIGS. 3D and 3E, regardless of the rotational speed of drum D. That is, the time when head H1 scans the range of wrap angle $\Theta a$ coincides with the time when the other head H2 scans the range of wrap angle $\Theta b$, at which time neither head scans the video signal. Similarly, the time when head H1 scans the range of the wrap angle $\Theta b$ coincides with the time when the other head H2 scans the range of wrap angle $\Theta a$.

A format of the recording signal for heads H1 and H2 will be described with reference to FIG. 1, in which a video signal Sv and an audio signal Sa of a received television broadcast are obtained from a tuner 1. The video signal Sv is converted into a digital signal by an analog-to-digital (A/D) converter 2 and is written into a frame memory 3. In frame memory 3, the continuous video signal is time-base compressed so that it can be recorded in the space available in a slant track in accordance with wrap angle $\Theta v$. Note that this is less than the 180° wrap angle normally provided for the video signal. The time-base compressing process is not limited to compressing all of the original video signal including the blanking period but it is also possible to use another approach in which only the effective video signal, excluding the blanking period, is fetched from the memory.

The digital video signal that was time-base compressed in frame memory 3 is read out according to a timing signal Pv, shown in FIG. 3H, and returned to an analog signal by a digital-to-analog (D/A) converter 4. The analog signal is supplied to a video signal processing circuit 5, wherein the signal is subjected to processing, such as emphasis, for example. The processed video signal is supplied to a frequency modulator 6 where it is frequency modulated. The modulated output signal of frequency modulator 6 is supplied through an equalizer circuit 7 to input terminals V of switching circuits 8 and 9, respectively. The output signals of switching circuits 8 and 9 are respectively supplied to the magnetic heads H1 and H2 through recording control switching circuits 10, 11, recording amplifiers 12, 13, and recording/playback change-over switches 14, 15, respectively. Typically, rotary transformers are provided between recording/playback change-over switches 14 and 15 and magnetic heads H1 and H2, however, a description of the rotary transformers is omitted here in the interest of clarity.

On the other hand, the audio signal Sa from tuner 1 is supplied to another analog-to-digital (A/D) converter 17 through one input terminal N of a switching circuit 16 and converted into a digital audio signal that is supplied to a digital signal processing circuit 18, wherein the continuous audio signal is time-base compressed so that it can be recorded in the range of wrap angle $\Theta a$. Note that this is the original audio program material and not the after recording signal. Other forms of signal processing such as the encoding of an error correction code, digital modulation, and the like are also executed in digital signal processing circuit 18. The output signal from digital signal processing circuit 18 is supplied to an equalizer circuit 19 according to timing signals Pa and Pb. A digital audio signal Sb from equalizer circuit 19 is supplied to input terminals AU of both switching circuits 8 and 9.

A servo reference signal Pr is formed by a servo reference signal generating circuit 20, and the servo reference signal Pr is fed to an output terminal 21 and also supplied to a timing signal generating circuit 22. The servo reference signal Pr is also supplied to a drum servo circuit (not shown) through output terminal 21. The rotational phase of drum D, that is, of heads H1 and H2, is controlled synchronously with the servo reference signal Pr by the drum servo circuit in the well-known manner.

Timing signal generating circuit 22 generates a timing signal Pa to control switching circuit 9 and a timing signal Pb to control switching circuit 8. Timing signal generating circuit 22 also generates the aforementioned timing signal Pv that controls frame memory 3.

In the case of performing ordinary audio/video recording, switching circuit 8 selects input terminal AU for the period of time when the timing signal Pa is at a high level, while switching circuit 8 selects the input terminal V for the period of time when the timing signal Pa is at a low level. Similarly, switching circuit 9 selects the input terminal AU for the period of time when the timing signal Pb is at a high level, while switching circuit 9 selects the input terminal AU for the period of time when the timing signal Pb is at a low level.

A switching circuit 23 selectively provides a control signal for recording control switching circuits 10 and 11. In the case of ordinary recording, that is, not after recording, switches 23a and 23b of switching circuit 23 are connected with respective input terminals N. Input terminal N of switch 23a is supplied with the servo reference signal Pr that has been inverted by an invertor 24, whereas input terminal N of switch 23b is supplied directly with the servo reference signal Pr.

When it is desired to perform after recording, the switching circuit 23 is switched by an after recording mode signal fed in at an input terminal 25. The after recording mode signal is also supplied to switching circuit 8, switching circuit 10, switching circuit 16, and digital signal processing circuit 18.

In the case of after recording an audio signal, the audio signal to be after recorded is fed in at input terminal 26 and supplied to an input amplifier 27. The output signal of input amplifier 27 is supplied to the other input terminal A of switching circuit 16. The audio signal selected by switching circuit 16, in this case the after recording audio signal, is processed in a manner substantially identical to the original audio signal from tuner 1.

The operation of the embodiment described above will be further explained with reference to FIGS. 3A-3K. FIG. 3A shows the video signal Sv and FIG. 3B shows the audio signal Sa, which are produced by tuner 1. The lengths of video signal corresponding to the periods of the rotational angles of 180° of the drum D are expressed as V1, V2..., and the audio signals of similar length are expressed by A1, A2, etc. FIG. 3C shows the servo reference signal Pr that controls the rotational phases of the heads H1 and H2.

FIG. 3D shows the rotational phases of the head H1, and FIG. 3E shows the rotational phase of the other head H2. The head H1 sequentially scans the tape T in the angle ranges Θa, Θg, Θv, and Θg, which are represented in FIG. 2, for the period of time when the servo reference signal Pr is at a low level. The other head H2 sequentially scans the tape T in the angle ranges Θa, Θg, Θv, and Θg, which are represented in FIG. 2, for the period of time when the servo reference signal Pr is at a high level. The period of time when head H1 scans the tape in the angle ranges Θa and Θg coincides with the period of time when head H2 scans the tape in the angle ranges Θb and Θc. Similarly, the period of time when head H1 scans the tape in the angle ranges Θb and Θc coincides with the period of time when head H2 scans the tape in the angle ranges Θa and Θg. This is a very important feature of this invention because when one of the heads is being supplied with recording current for after recording, the other head is scanning the old or original audio track, so that the reproduced video signal is not deteriorated. Note that in the case of after recording audio signals, the old audio track portions are not used.

The timing signals Pa and Pb are shown in FIGS. 3F and 3G, respectively, so that upon ordinary recording, switching circuits 8 and 9 select the input terminals AU for the periods of time when timing signals Pa and Pb are at a high level, respectively. Similarly, switching circuits 8 and 9 select the input terminals V for the periods of time when timing signals Pa and Pb are at a low level, respectively.

For the period of time when timing signal Pa is at a high level, the digital audio signal A1' formed from the audio signal A1 is supplied through switching circuit 8, recording control switching circuit 10, recording amplifier 12, and recording/playback change-over switch 14 to magnetic head H1. Therefore, digital audio signal A1' is recorded onto magnetic tape T by head H1 in the angle range Θa. Next, time-base compressed video signal V1' formed from video signal V1 is recorded onto magnetic tape T by head H1 in the angle range Θv. This represents normal or ordinary recording.

As represented in FIG. 3D, upon ordinary recording, magnetic head H1 is supplied with a recording signal only for the time that servo reference signal Pr is at a low level. Therefore, recording control switching circuit 10 is supplied with servo reference signal Pr through invertor 24 so that it can be ON only for the period of time when servo reference signal Pr is at a low level.

FIG. 3H represents timing signal Pv, which indicates the period of the time-base compressed video signal V1'. As shown then in FIG. 3K, for the period of time when timing signal Pb is at a high level, that is, in the angle range Θa of the next 180° scan period, the digital audio signal A2' is supplied through switching circuit 9, recording amplifier 13, and recording control switching circuit 15 to magnetic head H2 and recorded onto magnetic tape T. Similarly, in the angle range Θv, time-base compressed video signal V2' is recorded onto magnetic tape T by head H2, as shown in FIG. 3K. Recording control switching circuit 11 is directly supplied with servo reference signal Pr and turned ON only for time when servo reference signal Pr is at a high level. Thereafter, operations similar to those described above are repeated. The digital audio signal and time-base compressed video signal are alternately recorded onto magnetic tape T by heads H1 and H2 at locations in each slant track corresponding to wrap angle Θb.

In the case of after recording, an after recording mode signal is supplied at input terminal 25 and fed to switching circuit 16, digital signal processing circuit 18, switching circuit 23, switching circuit 8, and switching circuit 9. As a result, switching circuit 16 and switching circuit 23 are respectively switched to select input terminal A, and switching circuits 8 and 9 are set to input terminal AU. The audio signal that is to be used for after recording is supplied to input terminal 26, so that digital audio signals A11', A12', . . . for after recording are obtained. In this after recording mode, recording control switching circuit 10 is turned ON for the period of time when timing signal Pb is at a high level, while recording control switching circuit 11 is turned ON for the period of time when timing signal Pa is at a high level. Therefore, as shown in FIG. 3J, a digital audio signal A11' is recorded on magnetic tape T by head H1 on the sheet track in the time corresponding to angle range Θb. Next, digital audio signal A12' is recorded on magnetic tape T by head H2 in the next slant track i the period corresponding to angle range Θb, as shown in FIG. 3K.

In the after recording operation, the periods of time when the digital audio signals A11', A12', . . . are recorded do not overlap the periods of time when the time base compressed video signals V1', V2', . . . are recorded. Therefore, the reproduced output of the time-base compressed video signal is not lost or swamped by the after recording signal, and the audio signal can be after recorded while observing the reproduced video image. It is also generally necessary to supply the control signal to the recording/playback change-over switching circuits 14 and 15 to realize this function, however, explanation of this is omitted here in the interest of clarity and brevity.

The original digital audio signal could also be recorded in the portion of the slant track corresponding to the area of angle range Θb without instead of angle range Θa. Either one of the two audio recording areas can be selected to contain the original audio on the basis of the phases of the switching signals Pa and Pb.

The benefits provided by this invention are not limited only to after recording an audio signal, because even in the case of after recording an video signal, the reproduced output of the digital audio signal is not overpowered by the recording signal and after recording of the video signal can be performed while listening to the sound.

According to the present invention, the time during which the area for the video signal is scanned by the head does not overlap the time during which the area for the audio signal is scanned by the head. Therefore, a sound can be after recorded while observing the reproduced image or a video image can be after recorded while listening to the reproduced sound without using a special device, such as a reproducing amplifier in the drum, or a head used only for after recording, or the like. On the other hand, according to the present invention, the two areas that are provided for the audio sounds have the same length and timing. Therefore, one of the two areas can be selectively used by merely operating a switch with a switching signal, so that the signal processing can be simplified.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention, which should be determined from the appended claims.

What is claimed is:

1. Video tape recording apparatus for providing after recording, comprising:

tape guide means having a cylindrical outer surface for guiding a magnetic tape in a helical fashion on said outer surface for an extent exceeding 180°;

a pair of rotary magnetic head means oppositely arranged at 180° apart rotating at a predetermined speed and provided in association with said tape guide means for scanning slant parallel tracks on said magnetic tape, each of said tracks having a pair of audio portions Θa, Θb and a center video portion Θv located therebetween; and circuit means for selectively providing audio signals and video signals to said head means, whereby respective rotations of said rotary magnetic head means for 180° over lengths of said audio portions and said center video portion of said slant tracks are expressed as:

Θa+Θb=Θb+Θv=180° of head means rotation along each track, where Θa and Θb correspond to said pair of audio portions on each of said tracks and Θv corresponds to said center video portion, wherein said circuit means includes video signal recording circuit means for supplying a time-base compressed video signal to said circuit means for recording time-based compressed video signal on each of said tracks when said head means is scanning said center video portion of each of said tracks respectively, and audio signal recording circuit means for supplying a first time-base compressed audio signal to said circuit means for recording said first time-based compressed audio signal on each of said tracks each time said head means is scanning the same selected one of said pair of audio portions of each of said tracks, the other of said pair of audio portions being blank, and wherein said audio signal recording circuit means includes control means for supplying, subsequent to said recording said first time-based compressed audio signal in said same select one of said audio portions, a second time-based compressed audio signal to said rotary magnetic head means when said head means is scanning the other one of said pair of audio portions, thereby performing an audio after recording function of said second time-based compressed audio signal in the other one of said pair of audio portions of each of said tracks.

2. Video tape recording apparatus according to claim 1, wherein said same selected one of said pair of audio portions is audio portion Θa arranged before said video portion in said slant tracks.

3. Video tape recording apparatus according to claim 1, wherein said same selected one of said pair of audio portions is audio portion Θb arranged after said video portion in said slant tracks.

4. Video tape recording apparatus according to claim 1, wherein said tape guide means includes means for guiding said tape on said outer surface for an extent substantially equal to 210°, where Θa+Θv+Θb=210° of head rotation along each track.

5. Video tape recording apparatus according to claim 1, wherein Θa is substantially equal to Θb.

6. A video tape recorder for providing after recording comprising:

a cylindrical tape guide for guiding a magnetic tape over a surface thereof in a helical path for an extent substantially equal to 210° a pair of rotary magnetic heads, oppositely situated on said cylindrical tape guide and separated by 180° and arranged for scanning parallel slant tracks on the magnetic tape in the helical path;

circuit means for selectively providing audio signals and video signals to said pair of rotary magnetic heads as said heads are scanning said slant tracks, such that for a 180° rotation of each head as it scans the tape a respective track is scanned having a first audio portion $\Theta a$, a central video portion $\Theta v$, and a second audio portion $\Theta b$, where $\Theta a + \Theta b = \Theta b + \Theta v = 180°$ of head rotation along a track and $\Theta a + \Theta b + \Theta v = 210°$ of head rotation along a track;

video signal supply means for supplying a time-base compressed video signal to said circuit means for recording said time-based compressed video signal in each said central video portion $\Theta v$;

audio signal supply means for supplying an original, time-base compressed audio signal to said circuit means for recording in the same selected one of said first audio portion $\Theta a$ and said second audio portion $\Theta b$ of each of said tracks, the other, non-selected audio portion of each of said tracks having no signal recorded therein;

control means connected to said audio signal supply means for operation following recording of said original time-based compressed audio signal in said same selected on of said first audio portion $\phi_a$ and said second audio portion $\phi_b$ of each of said tracks for supplying an after recording, time-base compressed audio signal distinct from said original time-base compressed audio signal for recording in said other, non-selected audio portion of each of said tracks, thereby performing an after-recording operation.

* * * * *